United States Patent
Hsu et al.

(10) Patent No.: US 11,760,190 B2
(45) Date of Patent: Sep. 19, 2023

(54) ELECTRIC VEHICLE COOLING SYSTEM

(71) Applicant: Kwang Yang Motor Co., Ltd., Kaohsiung (TW)

(72) Inventors: Wei-Lin Hsu, Kaohsiung (TW); Min-Tse Hsu, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 203 days.

(21) Appl. No.: 17/490,418

(22) Filed: Sep. 30, 2021

(65) Prior Publication Data

US 2022/0111722 A1    Apr. 14, 2022

(30) Foreign Application Priority Data

Oct. 13, 2020   (TW) ................................. 109213364

(51) Int. Cl.
*B60K 11/02*    (2006.01)
*B60L 58/26*    (2019.01)
*B60K 1/00*     (2006.01)

(52) U.S. Cl.
CPC .............. *B60K 11/02* (2013.01); *B60L 58/26* (2019.02); *B60K 2001/005* (2013.01); *B60K 2001/006* (2013.01)

(58) Field of Classification Search
CPC .............. B60K 11/02; B60K 2001/005; B60K 2001/006; B60K 2001/003; B60L 58/26
See application file for complete search history.

(56) References Cited

U.S. PATENT DOCUMENTS

| | | | |
|---|---|---|---|
| 2013/0285486 A1* | 10/2013 | Imanishi | B60L 3/0061 310/53 |
| 2016/0159246 A1* | 6/2016 | Jung | B60H 1/00764 62/243 |
| 2022/0255491 A1* | 8/2022 | Kondo | H02M 7/48 |
| 2022/0402349 A1* | 12/2022 | Eser | B60L 58/26 |

* cited by examiner

*Primary Examiner* — Jacob M Amick
(74) *Attorney, Agent, or Firm* — RABIN & BERDO, P.C.

(57) ABSTRACT

An electric vehicle cooling system includes a vehicle control unit (VCU), a coolant pump controller, a motor controller, a motor, a vehicle charger, an electronic coolant pump, and a cooling plate. The electronic coolant pump, the vehicle charger, the motor controller, the motor, and the cooling plate are connected in sequence to form a closed coolant loop for a coolant. Either the VCU or the coolant pump controller of the electronic coolant pump can control the electronic coolant pump to switch between an idle mode and a normal mode according to a coolant temperature detected from the closed coolant loop. Under the normal mode, the VCU controls the electronic coolant pump to have an ideal pumping speed according to the coolant temperature detected from the closed coolant loop and a rotational speed of the motor, ensuring good cooling efficiency.

14 Claims, 5 Drawing Sheets

| °C / rpm | 89 | 90 | 91 | 92 | 93 | 94 | 95 | 96 | 97 | 98 | 99 | 100 | 101 | 102 | 103 | 104 |
|---|---|---|---|---|---|---|---|---|---|---|---|---|---|---|---|---|
| 1200 | 600 | 600 | 600 | 600 | 600 | 600 | 600 | 2100 | 4100 | 5300 | 6000 | 6000 | 6000 | 6000 | 6000 | 6000 |
| 2000 | 600 | 600 | 600 | 600 | 600 | 600 | 600 | 2100 | 4100 | 5300 | 6000 | 6000 | 6000 | 6000 | 6000 | 6000 |
| 3000 | 600 | 600 | 600 | 600 | 600 | 600 | 2100 | 2100 | 4100 | 5300 | 6000 | 6000 | 6000 | 6000 | 6000 | 6000 |
| 4000 | 1700 | 1700 | 1700 | 2100 | 2100 | 2100 | 3000 | 3000 | 4100 | 5300 | 6000 | 6000 | 6000 | 6000 | 6000 | 6000 |
| 5000 | 2100 | 2100 | 2100 | 2100 | 3000 | 3000 | 4100 | 4100 | 5300 | 5300 | 6000 | 6000 | 6000 | 6000 | 6000 | 6000 |
| 6000 | 2100 | 2100 | 3000 | 3000 | 4100 | 4100 | 5000 | 5900 | 5900 | 6000 | 6000 | 6000 | 6000 | 6000 | 6000 | 6000 |
| 7000 | 3000 | 3000 | 4100 | 4100 | 5000 | 5000 | 5900 | 6000 | 6000 | 6000 | 6000 | 6000 | 6000 | 6000 | 6000 | 6000 |
| 7500 | 4100 | 4100 | 5300 | 5300 | 5900 | 5900 | 6000 | 6000 | 6000 | 6000 | 6000 | 6000 | 6000 | 6000 | 6000 | 6000 |

FIG.2

ELECTRIC VEHICLE COOLING SYSTEM

CROSS-REFERENCE TO RELATED APPLICATION(S)

This application claims the priority benefit of TW application serial No. 109213364 filed on Oct. 13, 2020, the entirety of which is hereby incorporated by reference herein and made a part of specification.

BACKGROUND OF THE INVENTION

1. Field of the Invention

The present invention relates to an electric vehicle cooling system, and more particularly to an electric vehicle cooling system with better efficiency for a motor.

2. Description of the Related Art

A cooling system for an electric vehicle, such as an electric scooter, can be categorized into two types, an air-cooled type and a liquid-cooled type. The air-cooled type uses air convection for heat exchanging, and the liquid-cooled type uses a closed loop of a circulating coolant for cooling.

The liquid-cooled type of cooling system in the electric scooter is mainly driven mechanically, as a motor drives a coolant pump through a belt or other conventional mechanisms. The coolant pump and the motor work synchronically together. When the motor starts rotating, the coolant pump also starts pumping the coolant. This however limits a pumping speed of the coolant pump, as the pumping speed of the coolant pump is coupled to a rotational speed of the motor. When the coolant pump cannot independently adjust the pumping speed of coolant regardless of the rotational speed of the motor, the coolant pump cannot adjust the pumping speed according to an actual temperature inside of the vehicle. Further, since the coolant pump is driven by the motor, the coolant pump drains some power generated by the motor, decreasing efficiency of the motor.

SUMMARY OF THE INVENTION

The present invention provides an electric vehicle cooling system to control a coolant pump without a motor driving the coolant pump through a belt, thus improving efficiency of the motor.

In accordance to a first embodiment of the present invention, the electric vehicle cooling system includes:
 a vehicle control unit (VCU);
 a motor controller, electrically connecting to the VCU, and controlling a motor;
 a vehicle charger, electrically connecting the VCU;
 an electronic coolant pump, electrically connecting the VCU through a coolant pump controller; and
 a cooling plate;
 wherein the electronic coolant pump, the vehicle charger, the motor controller, the motor, and the cooling plate are connected in sequence, forming a closed coolant loop;
 wherein the VCU controls the electronic coolant pump to alternate between an idle mode and a normal mode according to a coolant temperature detected from the closed coolant loop;
 wherein in the normal mode, the VCU controls a pumping speed of the electronic coolant pump according to the coolant temperature detected from the closed coolant loop and a rotational speed of the motor.

In accordance to a second embodiment of the present invention, the electric vehicle cooling system includes:
 a vehicle control unit (VCU);
 a motor controller, electrically connecting the VCU, and controlling a motor;
 a vehicle charger, electrically connecting the VCU;
 an electronic coolant pump, electrically connecting the VCU through a coolant pump controller; and
 a cooling plate.
 wherein the electronic coolant pump, the vehicle charger, the motor controller, the motor, and the cooling plate are accordingly connected, forming a closed coolant loop;
 wherein the coolant pump controller controls the electronic coolant pump to alternate between an idle mode and a normal mode according to a coolant temperature detected from the closed coolant loop;
 wherein in the normal mode, the coolant pump controller controls a pumping speed of the electronic coolant pump according to the coolant temperature detected from the closed coolant loop and a rotational speed of the motor.

The present invention pumps out a coolant through the electronic coolant pump without needing a motor to drive the electronic coolant pump through a belt or other conventional mechanisms. Therefore, the present invention drains less power from the motor, improving the motor efficiency. The present invention further adjust the pumping speed of the electronic coolant pump to an ideal pumping speed according to a status of an electric vehicle, preventing components inside of the electric vehicle from overheating.

BRIEF DESCRIPTION OF THE DRAWINGS

FIG. 2 is a perspective view of a coolant pumping speed commanding form for an electronic coolant pump of the present invention.

DETAILED DESCRIPTION OF THE INVENTION

Figure 1:
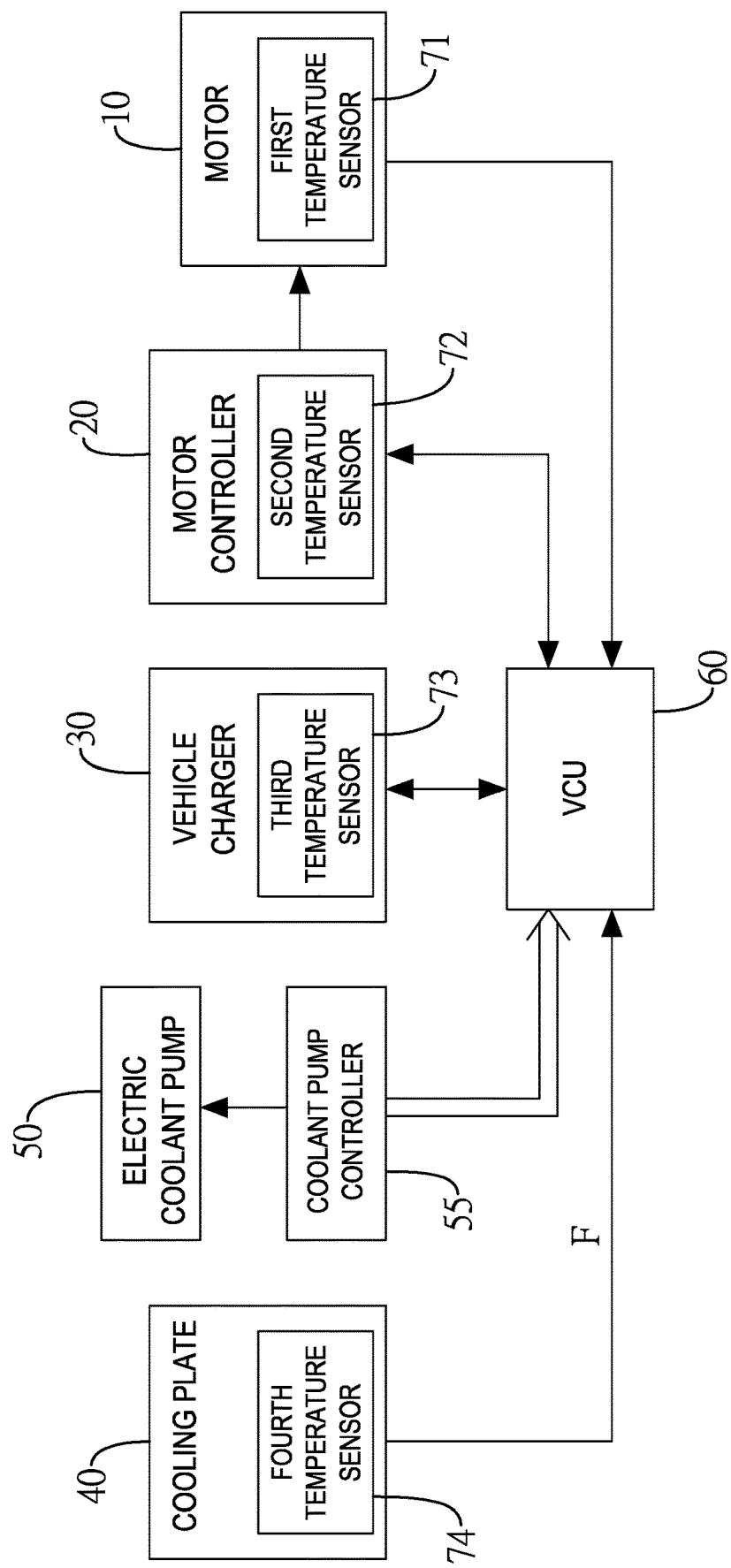
FIG. 1 is a block diagram of an electric vehicle cooling system of the present invention.

With reference to FIG. 1, the present invention provides an electric vehicle cooling system. The electric vehicle cooling system includes a motor 10 of an electric vehicle, a motor controller 20, a vehicle charger 30, a cooling plate 40, an electronic coolant pump 50, and a vehicle control unit (VCU) 60.

The motor 10 generates power for the electric vehicle. A first temperature sensor 71 is mounted on the motor 10 for sensing a motor temperature of the motor 10.

The motor controller 20 is electrically connected to the motor 10, and the motor controller 20 controls the motor 10. The motor controller 20 also receives a rotational speed of the motor 10 through, for instance, a Hall sensor. A second temperature sensor 72 is mounted on the motor controller 20 for sensing a motor controller temperature of the motor controller 20.

The vehicle charger 30 controls a battery unit of the electric vehicle for charging. A third temperature sensor 73 is mounted on the vehicle charger 30 for sensing a vehicle charger temperature of the vehicle charger 30.

The cooling plate 40 dissipates heat for the electric vehicle through air convection. A fourth temperature sensor 74 is mounted on the cooling plate 40 for sensing a coolant temperature F. The cooling plate 40 can work in conjunction with a fan, as the fan can improve a cooling efficiency of the cooling plate 40 by blowing more air to the cooling plate 40.

The electronic coolant pump 50 is controlled by a coolant pump controller 55. The electronic coolant pump 50 pumps out a coolant to circulate in a closed coolant loop. Unlike traditional mechanical pumps, the coolant pump controller 55 is able to control a pumping speed of the electronic coolant pump 50 independently from the rotational speed of the motor 10.

The VCU 60 is electrically connected to the first temperature sensor 71, the second temperature sensor 72, the third temperature sensor 73, and the fourth temperature sensor 74, and the VCU 60 correspondingly receives the motor temperature, the motor controller temperature, the vehicle charger temperature, and the coolant temperature F detected by the first to fourth sensors 71-74. The VCU 60 electrically connects to the first to fourth sensors 71-74 through multiple cables. The VCU 60 further electrically connects the coolant pump controller 55 and the motor controller 20 to exchange status messages through a controller area network (CAN BUS). The status messages, for instance, detail a status related to the rotational speed of the motor 10, the pumping speed of the electronic coolant pump 50, the coolant temperature F, and error messages of any possible failures.

The present invention compares the coolant temperature F obtained with a set temperature value defaulted. When the coolant temperature F is lower than or equal to the set temperature value, the electronic coolant pump 50 is controlled under an idle mode. When the coolant temperature F is higher than the set temperature value, the electronic coolant pump 50 is controlled under a normal mode. During the idle mode, the electronic coolant pump 50 pumps the coolant with a first pumping speed (rpm_1) for a first working period (t1_work), then the electronic coolant pump 50 stops pumping the coolant for a first waiting period (t1_stop) before pumping again, repeatedly alternating between the first working period (t1_work) and the first waiting period (t1_stop). The first pumping speed (rpm_1) can be set to zero, meaning that, in this case, during the idle mode, the electronic coolant pump 50 stops pumping the coolant all together.

An ideal working temperature for the motor 10 is around 90° C. to 95° C. When the electric vehicle is just switched on, immediately allowing the electronic coolant pump 50 to pump the coolant can slow down a rate for the motor 10 to reach the ideal working temperature. To prevent a situation that the motor 10 reaches the ideal working temperature slower and thus decreases an efficiency of the motor 10, the present invention controls the electronic coolant pump 50 under the idle mode before the coolant temperature F exceeds the set temperature value.

With reference to FIG. 2, after the coolant temperature F exceeds the set temperature value, the electronic coolant pump 50 is controlled under the normal mode. During the normal mode, the electronic coolant pump 50 maintains the pumping speed according to the pumping speed specified in a coolant pumping speed commanding form. The coolant pumping speed commanding form is created with reference to the coolant temperature F and the rotational speed of the motor 10, for accordingly sending a pumping speed command for the electronic coolant pump 50. In particular, columns of the coolant pumping speed commanding form specify the coolant temperature F ranging from 89° C. to 104° C., and rows of the coolant pumping speed commanding form specify the rotational speed of the motor 10 ranging from 1200 revolutions per minute (rpm) to 7500 rpm. The coolant pumping speed commanding form may be modified and fine-tuned according to performance tests and performance data collected. For example, when the coolant temperature F is detected to be 95° C. and the rotational speed of the motor 10 is detected to be 6000 rpm, the pumping speed command for the electronic coolant pump 50 during the normal mode will be 5000 rpm according to the coolant pumping speed commanding form. The electronic coolant pump 50 will then accordingly maintain the pumping speed at 5000 rpm. When the electronic coolant pump 50 works under the normal mode, the electronic coolant pump 50 can dynamically adjust the pumping speed to an ideal pumping speed according to the coolant temperature F and the rotational speed of the motor 10 detected. This way the coolant temperature F can be effectively controlled, and the efficiency of the motor 10 can improve.

The pumping speed is measured in rpm rather than a conventional unit such as liters per minute since the pumping speed relates to how many rpm the electronic coolant pump 50 rotates or travels for pumping the coolant. The higher the pumping speed is measured in rpm, the faster the electronic coolant pump 50 pumps the coolant measured in liters per minute.

In a first embodiment of the present invention, the coolant pumping speed commanding form is integrated into the VCU 60. The VCU 60 executes the actions described above according to the coolant temperature F detected. More particularly, the VCU 60 determines whether the idle mode or the normal mode should be executed according to the coolant temperature F and the rotational speed of the motor 10 detected. During the normal mode, the VCU 60 sends the pumping speed command to the coolant pump controller 55 according to the coolant pumping speed commanding form. The coolant pump controller 55 then accordingly controls the electronic coolant pump 50 to maintain the pumping speed specified by the pumping speed command.

In a second embodiment of the present invention, the coolant pumping speed commanding form is integrated into the coolant pump controller 55. The coolant pump controller 55 executes the actions described above according to the coolant temperature F provided by the VCU 60. The coolant pump controller 55 determines whether the idle mode or the normal mode should be executed according to the coolant temperature F and the rotational speed of the motor 10 detected. During the normal mode, the coolant pump controller 55 obtains the pumping speed command according to the coolant pumping speed commanding form, and the coolant pump controller 55 then accordingly controls the electronic coolant pump 50 to maintain the pumping speed specified.

After the motor 10 stops, the electronic coolant pump 50 is still able to work and pump the coolant for some time, preventing damage caused by sharp temperature increases caused by the electric vehicle being switched off.

Figure 3:
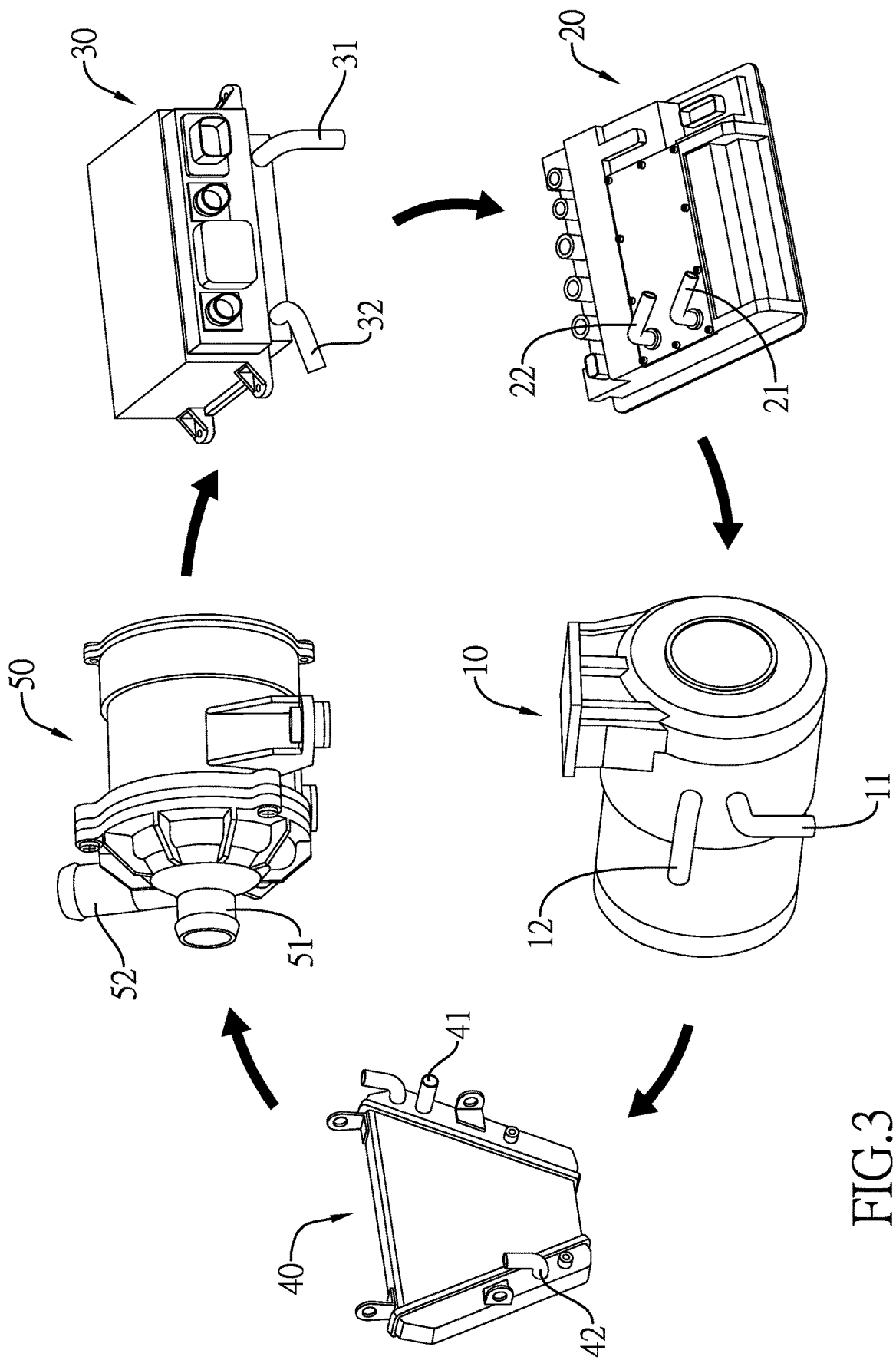
FIG. 3 is a perspective view of a closed coolant loop of the electric vehicle cooling system of the present invention.

With reference to FIG. 3, a perspective view of the closed coolant loop of the electric vehicle cooling system of the present invention is shown. A liquid inlet (11, 21, 31, 41, and 51) and a liquid outlet (12, 22, 32, 42, and 52) are respectively mounted to the motor 10, the motor controller 20, the vehicle charger 30, the cooling plate 40, and the electronic coolant pump 50 of the present invention. By connecting the electronic coolant pump 50, the vehicle charger 30, the motor controller 20, the motor 10, and the cooling plate 40 respectively, the closed coolant loop is formed. As a result, the coolant first flows out from the liquid outlet 52 of the electronic coolant pump 50, then accordingly travels through the vehicle charger 30, the motor controller 20, the motor 10, and the cooling plate 40. After the coolant is cooled from the cooling plate 40, the coolant re-enters the electronic coolant pump 50 through the liquid inlet 51, completing a circulation in the closed coolant loop. In FIG. 3, the arrow specifies a direction of how the coolant circulates as described above.

Figure 4:
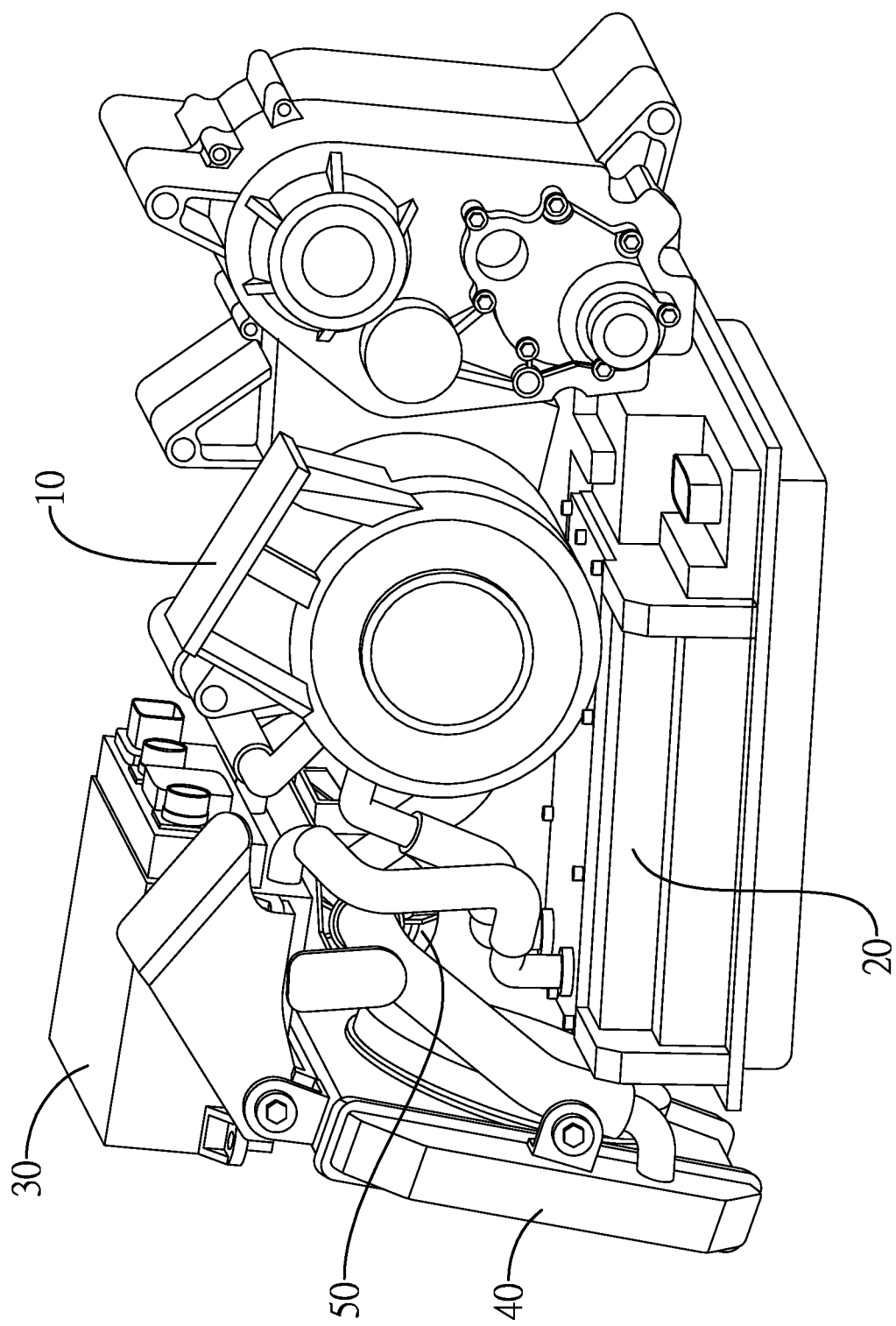
FIG. 4 is an external perspective view of the electric vehicle cooling system of the present invention.
Figure 5:
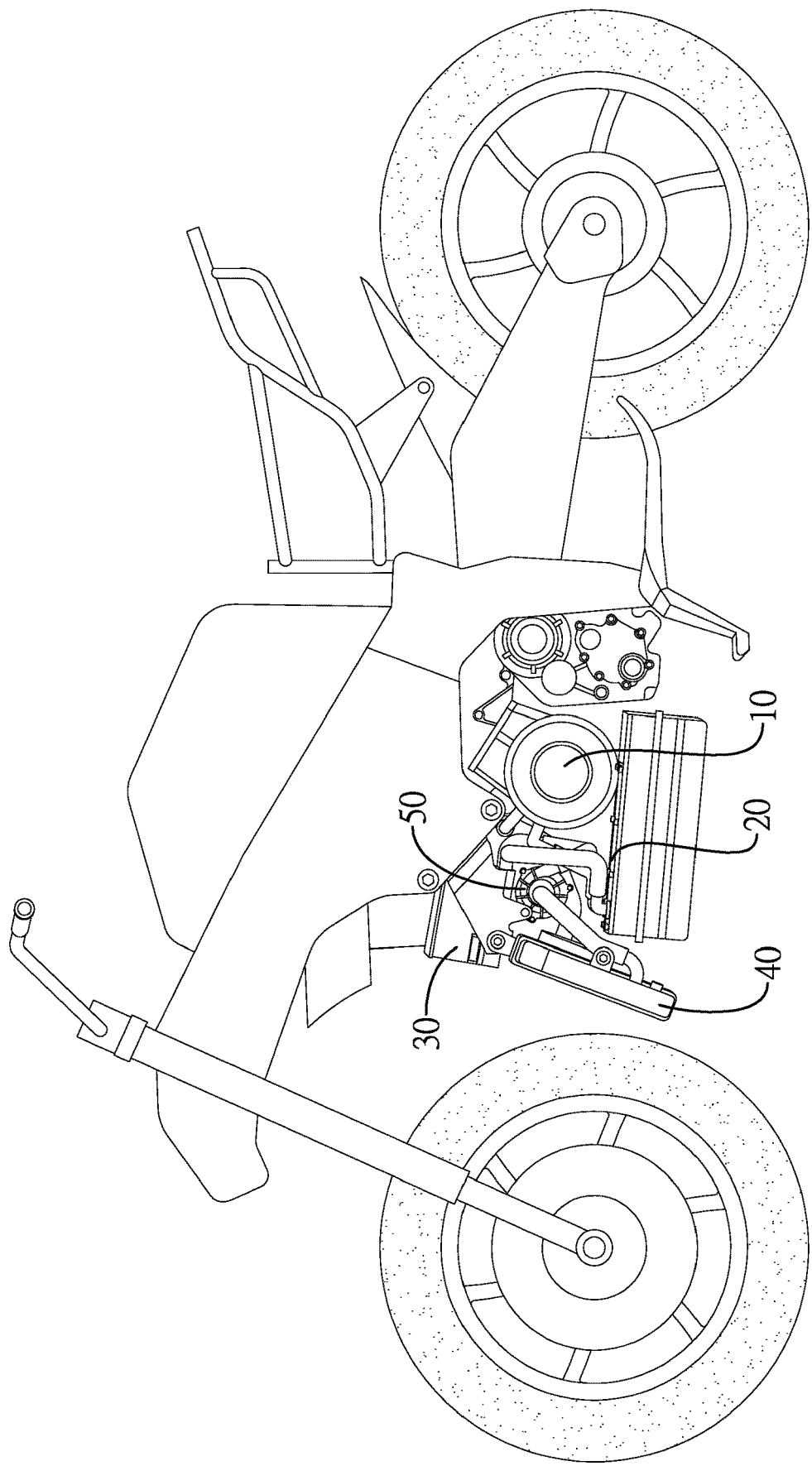
FIG. 5 is a perspective view of an integration of the electric vehicle cooling system of the present invention on an electric scooter.

With reference to FIGS. 4 and 5, perspective views of how the motor 10, the motor controller 20, the vehicle charger 30, the cooling plate 40, and the electronic coolant pump 50 of the present invention form the closed coolant loop and integrate to the electric vehicle are shown. Components of the present invention are roughly located under the battery unit of the electric vehicle. More particularly, the cooling plate 40 and the vehicle charger 30 are mounted near one side of a front wheel of the vehicle. The motor controller 20 is mounted under the motor 10. A vertical space is created between the cooling plate 40 and the motor 10. The electronic coolant pump 50 is mounted within the vertical space, effectively utilizing limited spaces within the vehicle and making the vehicle more compact.

In conclusion, the electric vehicle cooling system of the present invention is able to control the electronic coolant pump 50 according to the coolant temperature F of the coolant and the rotational speed of the motor 10 detected. The electric vehicle cooling system of the present invention is able to avoid wasting electricity, to effectively control the coolant temperature F of the coolant, to improve efficiency of the motor 10, and to precisely detect temperatures around the electric vehicle. Since the electronic coolant pump 50 is driven belt free, the present invention can also drain less energy from the motor 10.

What is claimed is:

1. An electric vehicle cooling system, comprising:
   a vehicle control unit (VCU);
   a motor controller, electrically connecting the VCU, and controlling a motor;
   a vehicle charger, electrically connecting the VCU;
   an electronic coolant pump, electrically connecting the VCU through a coolant pump controller; and
   a cooling plate;
   wherein the electronic coolant pump, the vehicle charger, the motor controller, the motor, and the cooling plate are connected in sequence, forming a closed coolant loop;
   wherein the VCU controls the electronic coolant pump to alternate between an idle mode and a normal mode according to a coolant temperature detected from the closed coolant loop;
   wherein in the normal mode, the VCU controls a pumping speed of the electronic coolant pump according to the coolant temperature detected from the closed coolant loop and a rotational speed of the motor.

2. The electric vehicle cooling system as claimed in claim 1, wherein
   when the VCU determines the coolant temperature detected from the closed coolant loop is lower than or equal to a set temperature value, the electronic coolant pump is controlled under the idle mode; and
   when the VCU determines the coolant temperature detected from the closed coolant loop is higher than the set temperature value, the electronic coolant pump is controlled under the normal mode.

3. The electric vehicle cooling system as claimed in claim 1, wherein
   the VCU comprises a coolant pumping speed commanding form;
   the VCU looks for a pumping speed command from the coolant pumping speed commanding form for controlling the electronic coolant pump under the normal mode according to the coolant temperature detected from the closed coolant loop and the rotational speed of the motor.

4. The electric vehicle cooling system as claimed in claim 3, wherein
   the VCU stops the electronic coolant pump from pumping the coolant under the idle mode.

5. The electric vehicle cooling system as claimed in claim 1, wherein
   a temperature sensor is mounted on the cooling plate, for sensing the coolant temperature detected from the closed coolant loop.

6. The electric vehicle cooling system as claimed in claim 1, wherein
   the cooling plate and the vehicle charger are mounted near one side of a front wheel of the vehicle, and the electronic coolant pump is mounted between the cooling plate and the motor.

7. The electric vehicle cooling system as claimed in claim 1, wherein
   the VCU is mounted under the motor.

8. An electric vehicle cooling system, comprising:
   a vehicle control unit (VCU);
   a motor controller, electrically connecting the VCU, and controlling a motor;
   a vehicle charger, electrically connecting the VCU;
   an electronic coolant pump, electrically connecting the VCU through a coolant pump controller; and
   a cooling plate;
   wherein the electronic coolant pump, the vehicle charger, the motor controller, the motor, and the cooling plate are connected in sequence, forming a closed coolant loop;
   wherein the coolant pump controller controls the electronic coolant pump to alternate between an idle mode and a normal mode according to a coolant temperature detected from the closed coolant loop;
   wherein in the normal mode, the coolant pump controller controls a pumping speed of the electronic coolant pump according to the coolant temperature detected from the closed coolant loop and a rotational speed of the motor.

9. The electric vehicle cooling system as claimed in claim 8, wherein
   when the coolant pump controller determines the coolant temperature detected from the closed coolant loop is lower than or equal to a set temperature value, the electronic coolant pump is controlled under the idle mode; and
   when the coolant pump controller determines the coolant temperature detected from the closed coolant loop is higher than the set temperature value, the electronic coolant pump is controlled under the normal mode.

10. The electric vehicle cooling system as claimed in claim 8, wherein the coolant pump controller comprises a coolant pumping speed commanding form;

the coolant pump controller looks for a pumping speed command from the coolant pumping speed commanding form for controlling the electronic coolant pump under the normal mode according to the coolant temperature detected from the closed coolant loop and the rotational speed of the motor.

11. The electric vehicle cooling system as claimed in claim 10, wherein the coolant pump controller stops the electronic coolant pump from pumping the coolant under the idle mode.

12. The electric vehicle cooling system as claimed in claim 8, wherein a temperature sensor is mounted on the cooling plate, for sensing the coolant temperature detected from the closed coolant loop.

13. The electric vehicle cooling system as claimed in claim 8, wherein the cooling plate and the vehicle charger are mounted near one side of a front wheel of the vehicle, and the electronic coolant pump is mounted between the cooling plate and the motor.

14. The electric vehicle cooling system as claimed in claim 8, wherein the VCU is mounted under the motor.

* * * * *